United States Patent [19]

Bilczo et al.

[11] Patent Number: 4,897,522

[45] Date of Patent: Jan. 30, 1990

[54] OUTPUT CONTROL CIRCUIT FOR INVERTER

[75] Inventors: Dale L. Bilczo, Rocky River; Larry L. Church, Jefferson; Michael J. Kurchak, Eastlake, all of Ohio

[73] Assignee: The Lincoln Electric Company, Cleveland, Ohio

[21] Appl. No.: 306,470

[22] Filed: Feb. 6, 1989

[51] Int. Cl.⁴ ............... B23K 9/10; H02M 3/335
[52] U.S. Cl. ................... 219/130.32; 363/26; 363/86; 323/258
[58] Field of Search .................. 363/24–26, 363/85, 86, 128, 129; 323/258, 263; 219/130.1, 130.21, 130.31, 130.32, 130.33

[56] References Cited

U.S. PATENT DOCUMENTS

| | | | |
|---|---|---|---|
| 3,231,751 | 1/1966 | Bates | 323/263 |
| 3,356,928 | 12/1967 | Parrish | 219/130.32 |
| 4,503,316 | 3/1985 | Murase et al. | 219/130.32 |
| 4,521,671 | 6/1985 | Fronius | 219/130.32 |
| 4,736,284 | 4/1988 | Yamagishi et al. | 363/24 |

Primary Examiner—Peter S. Wong
Attorney, Agent, or Firm—Body, Vickers & Daniels

[57] ABSTRACT

A control circuit is provided for the output of a high frequency inverter of the type having an output transformer with a core, primary windings and a secondary winding with two sections for creating a first secondary current pulse of electrical current in one section when the primary windings magnetizes the core and a second secondary current pulse in the other of the secondary sections when the primary windings remagnetizes the core. By alternating switch means for passing current through the primaries to magnetize and remagnetize the core at a preselected rate the output current pulses are provided by the two sections of secondary windings. The control circuit of the present invention involves a modification of the output transformer secondary stage. A first auxiliary winding is connected to one of the secondary sections to create an auxiliary current pulse as the core of the transformer is magnetized. A means is then employed for limiting this auxiliary current pulse and for adding the limited auxiliary current pulse to the first secondary pulse created by the secondary section to which the auxiliary winding is connected. In a like manner, a second auxiliary winding is connected to the other of the secondary sections to create a second auxiliary current pulse as the core is remagnetized. Means are provided for limiting the second auxiliary current pulse and for adding the second auxiliary current pulse to the second secondary current pulse from the secondary winding. Addition of limited current pulses to secondary current pulses created by the inverter provides a maximum output voltage which is higher than the maximum output voltage normally available while conserving primary current under higher output current conditions.

15 Claims, 5 Drawing Sheets

OUTPUT CONTROL CIRCUIT FOR INVERTER

The present invention relates to the art of high frequency inverters of the type used as power supplies for arc welding operations and more particularly an improved output control circuit for such an inverter.

The invention is particularly applicable for a high frequency inverter used for D.C. welding wherein a rectified D.C. power supply is alternately switched to magnetize and remagnetize in the opposite flux direction the core of an output transformer. The switching operation is accomplished by two separately and alternately operating switch means such as FET's, wherein one switch means is activated to magnetize the core of an output transformer and the other switch means is activated to remagnetize the core. By alternating the operation of the two switch means, high frequency alternating current is magnetically coupled into the secondary windings on the same core. Said high frequency secondary current is directed by rectifying means such as high speed diodes through electrical current filtering means such as an inductor to the output terminals of the D.C. welder.

The secondary stage of the output transformer for an inverter of the type to which the present invention is particularly directed has two winding sections which are separately rectified. When the output transformer core is magnetized in one direction and then remagnetized in the opposite direction, the secondary winding sections are alter-nately polarized to forward bias the diodes to which they are separately connected. High frequency electrical current pulses of the proper polarity are thus directed toward the inductor of the welder, through the inductor to the output terminals of the D.C. welder and thus to the welding station.

The first and second switch means of the inverter are controlled by electrical trigger or gate pulses of a selected pulse time duration (pulse width) and repetition rate. To control the magnitude of welder output current or voltage, the width of the trigger pulses is varied. As more current or voltage is required for the welding operation, the width of the trigger pulses energizing or actuating the alternately operated switch means of the inverter is increased in proportion to the desired increase in output.

This feedback controlled arrangement of the inverter stage is normally accomplished by voltage controlled pulse width modulation circuitry operated at a selected frequency, such as 20 KHz. These modulators are commonly used in electrical switch mode inverter power supplies as is herein addressed and are available in the form of standard integrated circuit packages familiar to those conversant in the art. The selected frequency of operation affects the response time of the welder to the feedback or sensing voltage signals and thus affects the ability of the welder to respond to small perturbations in the welding arc. A high frequency (above approximately 10 kilo-Hertz) is necessary to provide substantial improvements in performance. The frequency of operation also affects the audiblity of the arc and the welder circuitry and so to minimize objectionable noise and improve operator appeal a frequency above approximately 20 kHz. should be chosen. Frequencies above these limits will satisfy the aforementioned-constraints but have the undesirable affect of increasing the power wasted in the switch and rectifying elements and increasing the demands imposed upon the gating trigger circuitry.

As so far described the high frequency inverter type power supply is relatively known and has in the application of an arc welding power supply, the possible advantages of being smaller and lighter weight and the potential to be a superior arc welder because of a faster feedback circuit response time. These inverters can be employed for a wide variety of D.C. arc welding operations. However, the design limitation of minimizing the inverter primary current and thus switch means current, to obtain the size and weight advantages over conventional arc welding power supplies and to minimize the expense of the switching means, dictates the usage of an inverter transformer having the highest possible ratio of primary to secondary turns. This ratio must be determined by the voltage required by the welding process at the inverter welder's maximum output current. Unfortunately, the maximum output voltage of such inverters operating at even substantially reduced output current is too low in magnitude to provide the proper arc ionization potential for the SMAW process (stick welding) when long arc lengths are held. In addition, the welder output voltage/current characteristic curve being relatively flat (that is, having only a few volts change per 100 amps change in current) generally does not allow a transient operating point desired for stick welding, such as 50 volts at 50 amperes. Thus, when high frequency inverter power supplies of the type described above have been used, relatively expensive stick electrodes were required to stabilize the arc.

This deficiency may be overcome by an energy storage means such as an inductor connected to the welder output circuitry to store and then release enough energy at a high enough potential to provide both the arc ionization potential and the voltage/current operating point required for proper operation. An inductor having the ability to provide these characteristics would, however, add significant weight and size to the welder. An improvement to stick electrode operating stability may be realized by the use of an electrode which has a substantial amount of stabilizing coating. This coating is expensive and is also a substantial limitation to the use of a relatively small, high frequency inverter power supply designed for the whole range of D.C. welding operations.

In summary, a high frequency inverter welder designed to have minimum size and weight is generally limited in its operation due to the low maximum output voltage characteristic and lower overall voltage response as a function of current. It has been suggested that this problem can be resolved by increasing the number of turns in the secondary windings, increasing the capacity of the output inductor or, to some advantage, using stick electrodes with a highly stabilized electrode coating. But for reasons previously noted, these solutions are not desirable.

THE INVENTION

The present invention overcomes the disadvantages set forth above and allows creation of an increased maximum output voltage and high voltage at the desired operating current for a high frequency inverter of the type driving an output or load transformer while minimizing the increase in the current flow at the primary side of the output transformer.

In accordance with the present invention, added windings are provided at opposite ends of the secondary winding of the transformer. These auxiliary windings at each end of the secondary creates a further voltage and current source that is rectified by a unidirectional device connected in series with each auxiliary winding. A current limiting component, such as an inductor, restricts the amount of current flowing in each auxiliary winding and thus restricts the amount of current added to the primary current pulse but still creates the desired voltage/current characteristic curve for the welder output. The inverter will have a maximum welding voltage substantially greater than that obtained without the auxiliary windings. This increased maximum output voltage is desirable, together with the increase in voltage in the characteristic curve. These operating parameters accomplished by the auxiliary windings allow satisfactory stick welding, even when the stick electrode is provided with little or no stabilizing coating. Thus, use of the present invention converts an high frequency inverter power supply into a power supply having a relatively high maximum output voltage and higher voltage characteristics without a reflected high current flow in the primary stage of the output transformer of the power supply. By use of the present invention, there is minimal increase in the root mean square value of the current handled by the switching devices in the primary side of the output transformer.

In accordance with the present invention, the auxiliary windings in the secondary side of the transformer are each provided with an inductance in series with a rectifying diode. In this manner, the amount of current allowed to flow in the auxiliary windings is controlled. The added winding increases the voltage levels for various output current levels. In this manner, the characteristic curve of the power supply is shifted in an upward, increased voltage direction with only a minor disturbance in the input side of the transformer. The RMS current of the input stage is not increased to the extent that undue heating of the switching devices results.

In accordance with the preferred embodiment of the invention, the current limiting components for the auxiliary windings in the secondary stage of the power supply are inductors. Because of operating frequency selected, these inductors are relatively small and, in the preferred embodiment, have an inductance value selected to obtain 50 amperes at 50 volts at the welder output terminals. By using inductive reactance there is a natural output drop at high currents which further enhances control over the induced current flow in the primary.

In accordance with another aspect of the present invention, the rectifying diode in the current control circuits of each of the auxiliary windings is replaced by a silicon controlled rectifier (SCR). When a primary winding induces a current pulse of the proper polarity in one of the auxiliary windings, the SCR of that particular auxiliary winding may be triggered or gated on. By utilizing SCR's as selectable rectifying devices, the auxiliary windings can be activated or deactivated as needed. In accordance with this aspect of the invention, the average current at the welder output is sensed. If the average current is above a preselected level, the SCR's of both auxiliary windings are inhibited or disabled. Thus, the inverter functions as if the auxiliary windings did not exist unless low current operation of the inverter is required. Then, the SCR's are operative and they are conductive in unison with input pulses to the primary windings.

By using the present invention, there is satisfactory performance for unstabilized stick electrode, such as the EXX10 classification of electrodes. This general class of electrodes has low stabilization which heretofore could not be employed in an high frequency inverter of the type to which the present invention is directed. Of course, the present invention improves the operation of other classes of stick electrode some having stabilizing coating, such as EXX11 and EXX13. In summary, the present invention allows the use of low stabilized stick electrode for stick welding. But, it also enhances the operation of some of the stabilized stick welding electrode by raising the voltage characteristic of the inverter output. This is an improvement over the standard output circuit for an high frequency inverter as described above.

In accordance with the preferred embodiment of the invention, each of the auxiliary windings has six turns and employs a series inductive reactance. This arrangement boosts the voltage at low current outputs while not employing the full voltage output of the auxiliary windings at high current levels since the inductive reactance has a selected high reactance drop. Consequently, the increased current flow in the primary windings of the power supply due to current in the auxiliary windings is less apparent at higher current outputs even within the output current range that the SCR's are conducting.

In accordance with the present invention there is provided an improvement in a high frequency inverter for supplying a D.C. current to a welding station, including an electrode element and a work-piece element. This inverter includes an output transformer having a core, primary windings and first and second secondary windings connected in series at a common junction to define spaced winding ends referred to sometimes as first and second output terminals. In this fashion, the two sections of secondary windings are connected to the output through a rectifying arrangement to allow current flow through each of the secondary windings during alternate magnetizing and remagnetizing of the transformer core. Pulses of D.C. current are filtered through the standard choke and directed to the welding station as the current flows in appropriate directions in the primary windings of the output transformer. The inventive improvement includes a first auxiliary voltage boosting winding connected to and in series with the first secondary winding and a first current control circuit means for connecting the first auxiliary winding to one of the elements of the welding station. This first current control circuit means includes a unidirectional device poled in the same direction as the unidirectional device used to rectify the first secondary winding. Consequently, current induced to flow in the first secondary winding is added to the current flow in the first auxiliary winding. Since the windings are connected so that the voltages are additive, the output voltage is increased. The current control circuit for the auxiliary winding further includes a current limiting element so that the current is additive, but in a limited nature. In this manner, the increased current by the increased induced voltage is limited to the extent it flows through the current control circuit associated with the auxiliary winding. A second auxiliary voltage boosting winding is connected to and in series with the second secondary winding in the same fashion as the first auxiliary winding. Thus, the two auxiliary windings with current limiting devices are additional turns in the secondary. This induces higher voltage to add current pulses created by the two secondary windings to the normal current pulses supplied to the choke. In the preferred embodiment the maximum output voltage is increased from 43 volts to about 110 volts with six extra turns in each auxiliary winding. The current limiter allows 50 amperes to flow at 50 volts with 20 KHz operation.

The primary object of the present invention is the provision of an improvement in an inverter output control circuit which allows an increased maximum output voltage and an increased voltage in the voltage/current characteristic curve without increased, induced current flow in the primary section of the control circuit.

Another object of the present invention is the provision of an improved control circuit, as defined above, which improved control circuit allows an inverter to operate in a stick welding mode with stick electrode having a minimum or no stabilizing coating.

Yet another object of the present invention is the provision of a control circuit, as defined above, which control circuit can be added to a standard high frequency inverter output circuit at relatively minor expense and without the need for increased current carrying capabilities for the switching devices employed in the inverter. High frequency means operation in the general range of 3–35 KHz and preferably about 20 KHz.

These and other objects and advantages will become apparent from the following description taken together with the accompanying drawings.

PREFERRED EMBODIMENT OF THE INVENTION

Figure 1:
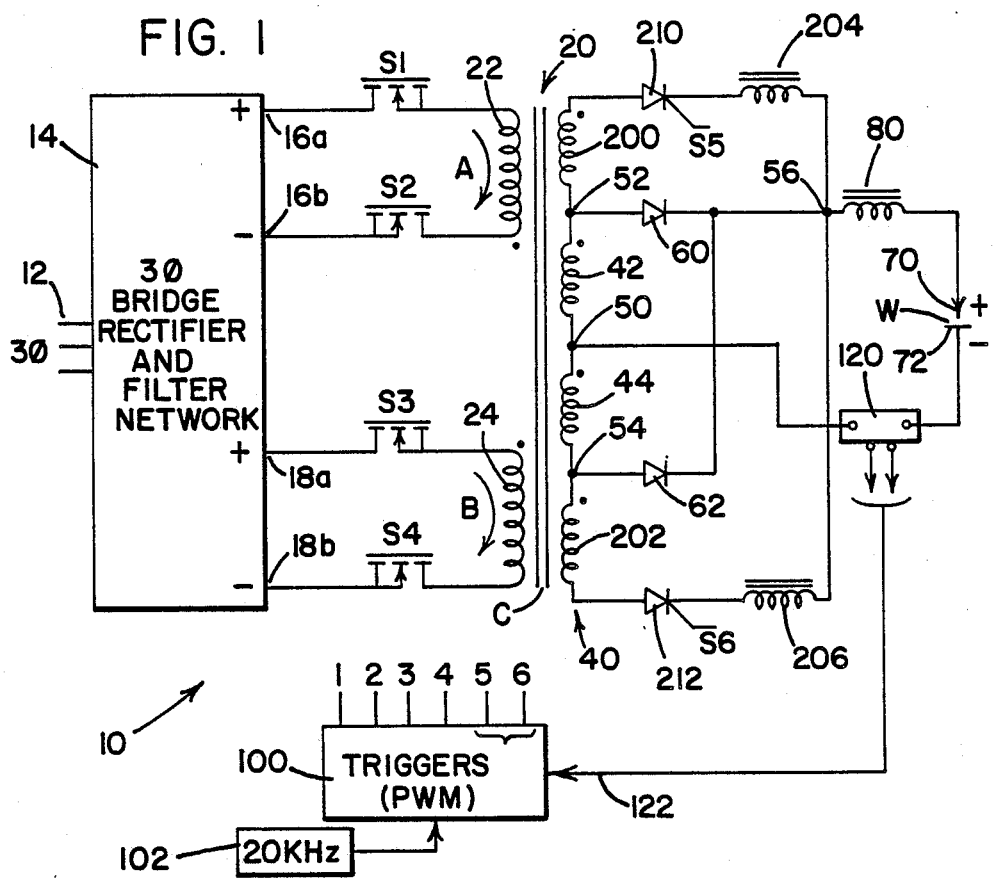
FIG. 1 is a schematic wiring diagram showing the preferred embodiment of the present invention.

Referring to the drawings wherein the showings are for the purpose of illustrating a preferred embodiment of the invention and not for the purpose of limiting same, FIG. 1 shows a high frequency inverter 10 of the type having a three phase input 12 and a three phase bridge rectifier and filter network 14 to develop a D.C. output illustrated as two separate sets of output terminals 16a, 16b and 18a, 18b. Of course, the output of the rectifier is a single positive and negative terminal. The two sets of output terminals are representative in nature to show power supplied to output transformer 20 by way of first primary winding 22 and second primary winding 24. In this embodiment one winding is used to magnetize core C and a separate winding is used to remagnetize the core. In some high frequency inverters current in opposite directions is passed through a single winding serving as the primary of the output transformer. Two sets of switching devices S1, S2 and S3, S4 are employed for the purpose of magnetizing and remagnetizing core C of transformer 20. Switching devices S1–S4 are illustrated as FET's. Actuation of devices S1, S2 causes current to flow in the direction A through the first primary winding 22. In a like manner, closing, or actuation, of the switches or switching devices S3, S4 causes current flow in the direction B through second primary winding 24. In this manner, core C of transformer 20 is alternately magnetized and remagnetized by alternate operation of the switching sets. This causes induced voltage in the winding of the secondary or output stage of the inverter comprising a secondary winding 40 shown as divided into separate sections 42, 44. These sections can be individual windings or sections of a single winding, since they are polarized in the same direction. A tap at the center of winding 40 is a common junction 50. Spaced winding ends 52, 54 constituted the output stage for the inverter before incorporating the present invention. Rectifying diodes 60, 62 cause a D.C. output between common junction or tap 50 and a common output terminal 56 for receiving current flow from terminals 52, 54. D.C. current between tap 50 and terminal 56 flows through the welding station W, comprising standard stick electrode 70 and work piece 72. Pulses of current between junction or tap 50 and terminal 56 are filtered through a standard choke 80 and applied across welding station W.

To synchronize the actuation of the two sets of switchable devices S1–S4, there is provided a standard trigger or gating circuit 100 controlled in a pulse width modulation mode and having a sequencing clock 102 operating with a frequency of 20 KHz. Circuit 100 includes outputs or gates 1–6, with outputs 1–4 adapted to produce actuating signals for switching devices S1–S4, respectively. During the first operating phase, a gate signal or trigger pulse on outputs 1 and 2 actuate switches S1, S2, in unison, causing current flow in the direction A through winding 22. Thereafter, the actuating gate signals on outputs 1, 2 are removed and gate signals are generated on outputs 3, 4. These signals or trigger pulses actuate switches S3, S4 to cause remagnetizing current flow B through winding 24, as shown in FIG. 1. The pulses at outputs 1, 2 and then at outputs 3, 4 are generated at a pulse rate of 20 KHz. The width of the pulses is varied to control the output current in the welding station. In a constant current welding mode such as SMAW, stick welding, this is generally accomplished by sensing current flow in the output circuit by a detector, such as shunt 120. The sensed current controls circuit 100 by changing the pulse width in accordance with the voltage on schematically illustrated line 122. As the current decreases, the voltage on line 122 decreases and the width of the trigger pulses for FET S1-S4 increases in accordance with standard pulse width modulation concepts.

Figure 2:
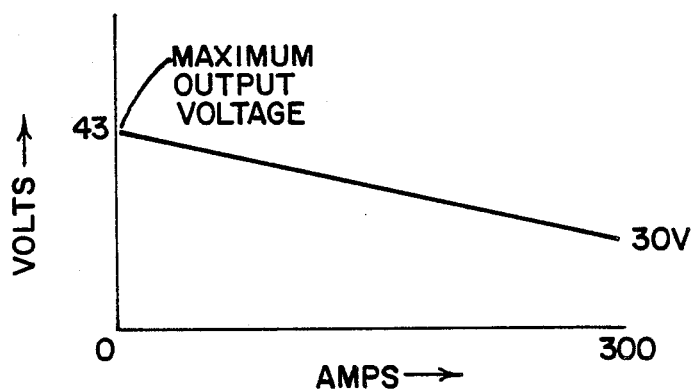
FIG. 2 is a voltage/current characteristic curve of the high frequency inverter system shown in FIG. 1 without employing the present invention.

In practice, operation of the high frequency inverter 10 as so far described produces a voltage/current characteristic curve as illustrated in FIG. 2. The maximum output voltage is approximately 43 volts and the slope over 300 amperes is approximately 13 volts. This characteristic curve will not allow an operating point of 50 volts at 50 amperes desired for stick welding. In addition, a maximum output voltage substantially greater than 43 volts is required to stabilize a stick welding operation in the case of an extended arc length. In view of these parameter deficiencies in the inverter 10, as so far described, it is difficult to use this inverter for stick welding. In addition, such stick welding will require expensive electrodes of the type having stabilizing coating.

Figure 6:
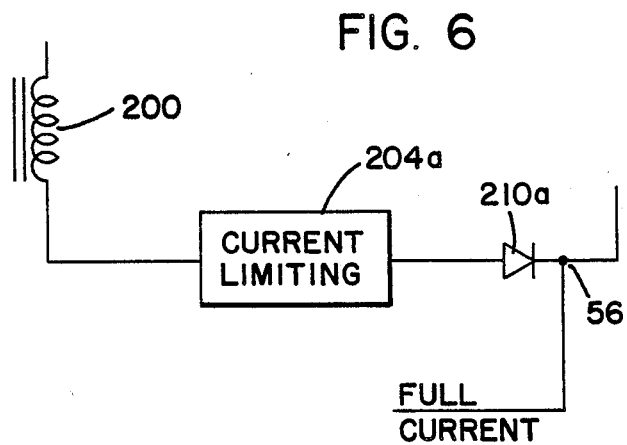
FIG. 6 is a wiring diagram showing the broadest aspect of the present invention.

In accordance with the present invention, the standard architecture for high frequency inverter 10 is modified to include auxiliary voltage boosting secondary windings 200, 202. These windings are connected in series with secondary winding sections 42, 44. In practice, each of these windings is comprised of enough turns to increase the maximum output voltage from 43 volts to about 110 volts. These auxiliary windings are in series with current control circuits including current limiting inductors 204, 206, respectively. Of course, a resistor could be used for current limiting purposes; however, chokes 204, 206 are more efficient than resistors because they generate less heat. Unidirectional devices 210, 212 are coordinated with diodes 60, 62 to rectify the output currents of the auxiliary current windings 200, 202. Unidirectional devices 210, 212 are illustrated as SCRs S5 and S6, respectively. In FIG. 6, the current limiting device is box 204a, to show only the general need to limit this current, with a unidirectional device illustrated as merely a diode 210a, SCRs provide the capability of selectively implementing the auxiliary current windings 200, 202 as described later in relationship to the showings of FIG. 8 and 9.

Figure 3:
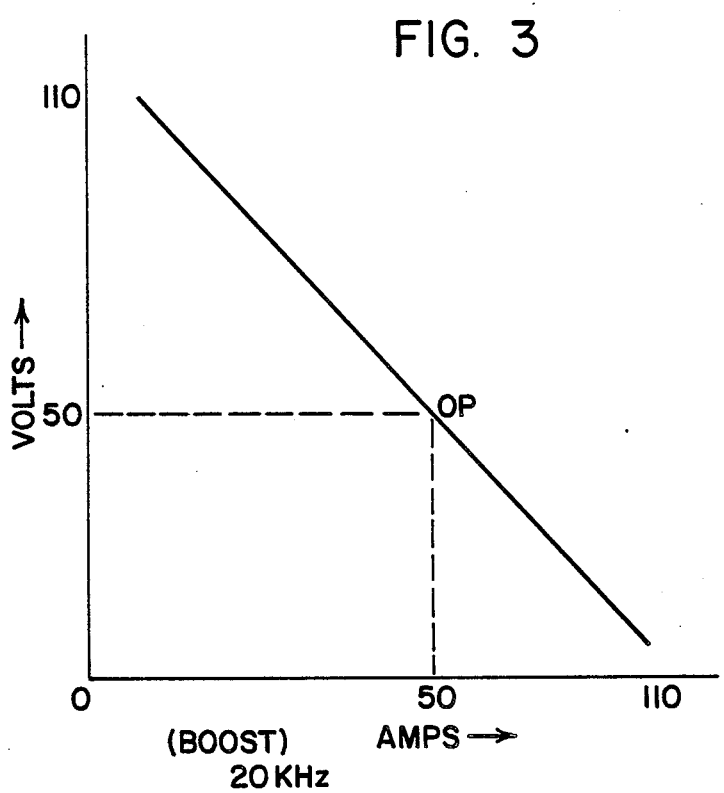
FIG. 3 is a schematically represented voltage/current characteristic curve for the auxiliary windings employed as the voltage boost windings in the present invention and operated at 20 KHz.
Figure 4:
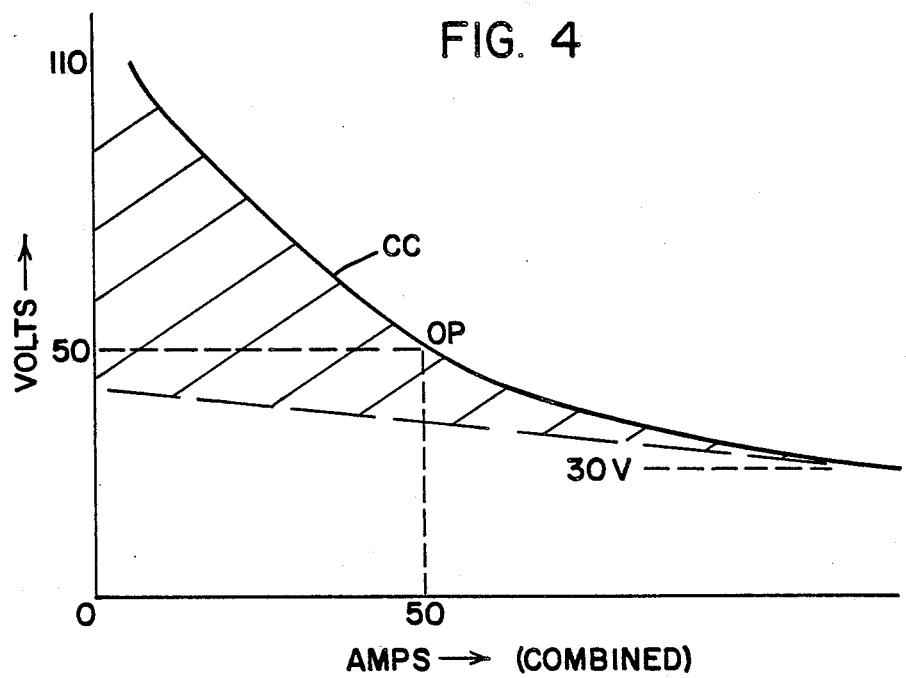
FIG. 4 is a composite voltage/current characteristic curve used to illustrate the advantage of employing the present invention in an high frequency inverter of the type normally developing the characteristic curve shown in FIG. 2.

By using the auxiliary secondary windings, the current characteristic of these windings is superimposed upon the standard characteristic curve shown in FIG. 2. To illustrate this concept, FIG. 3 shows, schematically and for illustrative purposes only, a general voltage/current characteristic for the auxiliary secondary windings. Inductors 204, 206 are selected so that a preselected operating point OP resides on the curve for the auxiliary secondary windings as shown in .FIG. 3. In practice, operating point OP is 50 volts at 50 amperes. Chokes 204, 206 are selected based upon an operating frequency of 20 KHz, as determined by the clocking input to the pulse width modulator or trigger circuit 100 shown in FIG. 1. By utilizing the two auxiliary windings 200, 202, the composite characteristic curve for the high frequency inverter is now shown in FIG. 4. This curve is a composite formed by adding the current characteristic of the auxiliary windings shown generally in FIG. 3 and the standard characteristic curve of FIG. 2. This composite curve is not purely additive and is based upon the ratio of turns in the windings and other electrical characteristics. The basic concept of the present invention is illustrated in FIG. 4 wherein the added voltage by the auxiliary winding and the limited current flow in the parallel current controlling circuits are combined with the voltage and relatively unlimited current flow, in the normal winding to produce the characteristic curve CC. A maximum output voltage over 110 volts and a D.C. welding operation mode at an operating point of 50 volts and 50 amperes are realized. Curve CC has an increased voltage without a proportional increase in current flow. The shaded portion of the graph illustrated in FIG. 4 is to illustrate the added portion caused by the secondary windings or auxiliary windings 200, 202 as shown in FIG. 1.

Figure 5:
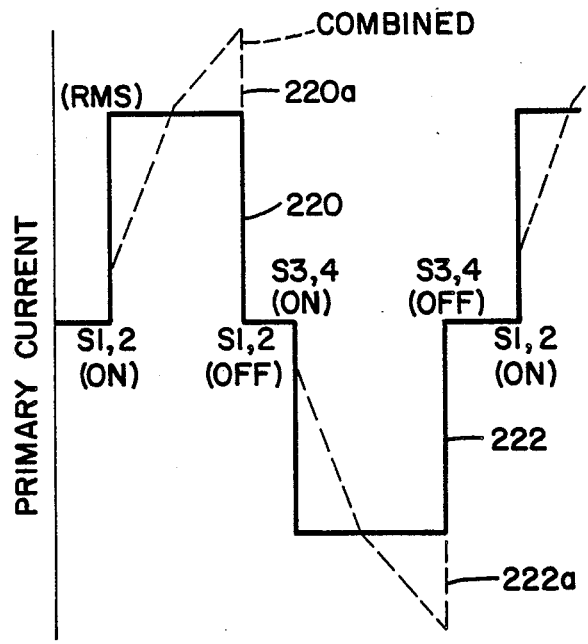
FIG. 5 is a comparative current graph of current flow in the primary stage of the output transformer showing the advantage of employing the present invention with respect to the input current characteristics of the power supply shown in FIG. 1.

Referring now to FIG. 5, the current flow in the primary stage of inverter 10 is schematically illustrated as current pulses 220, 222. Pulse 220 is the current flow when switches S1, S2 are on. In a like manner, pulse 222 is the current pulse when switches S3, S4 are on. Pulses 220, 222 are shown as opposite polarities to illustrate the current flow as if a single primary winding were used. If additional windings were added to sections 42, 44 for the purpose of increasing the maximum output voltage, the magnitude of pulses 220, 222 would be increased. This would represent a proportional increase in the root mean square current flowing in the input stage of inverter 10 and would require a more extensive heat dissipation arrangement or more expensive switching devices. The current flow in the primary stage caused by implementing the first embodiment of the present invention, wherein diodes are used as rectifying elements, in place of SCR's S5, S6, results in the current pulses 220a, 222a shown in the dashed lines. At the start of each pulse, the induced current flow is somewhat low due to greater effect of the current limiting function. As the output current increases in a given pulse, the current limiting function is less prominent allowing a higher primary current.

Consequently, at the end of the pulse higher currents result from using the auxiliary windings 200, 202; however, the actual heating effect is not increased as much as it would be by an increase in secondary turns 42, 44 required to obtain the same increase in maximum output voltage. Consequently, a lower increase in the heating effect of the primary stage of inverter 10 is caused by implementing the present invention.

In the preferred embodiment of the present invention, using SCR's as controlled rectifying elements S5, S6, the primary current wave shape can be represented as 220a, 222a in FIG. 5 for output current levels below a selected threshold, such as 175 amperes, and as current pulses 220, 222 above that threshold. At or about that threshold current level S5, S6 are switched off or on so that the auxiliary windings are additive to the secondary windings below that level and effectively out of the circuit above that level. At maximum output current the primary currents are as low as they would be in an inverter with a corresponding low number of secondary turns.

In FIG. 6, the relative relationship of the full current portion of the output current and the limited current portion is illustrated as a parallel circuit. The voltage is determined by the total turns (i.e. adding the auxiliary and normal secondary windings) whereas the current is a summation of full current from the normal windings and limited current from the auxiliary winding.

Figure 7:
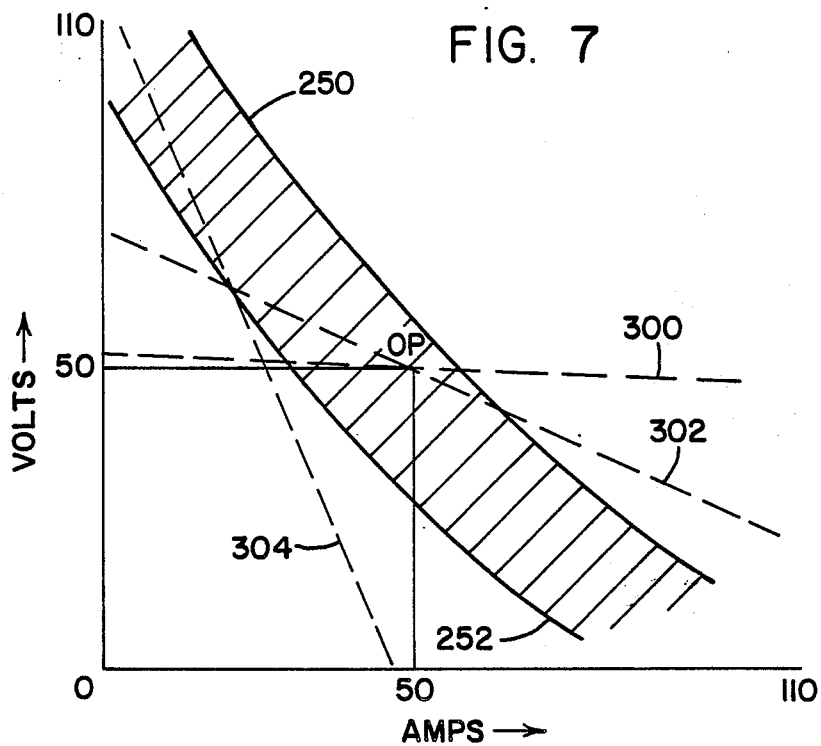
FIG. 7 is a composite voltage/current characteristic curve showing further aspects of the present invention.

Referring now to FIG. 7, implementation of the present invention can be done to provide a characteristic curve having a maximum output voltage and OP in the general shaded area defined by lines 250, 252. This is illustrative in nature and excludes characteristic curves such has lines 300, 302, and 304. The characteristic curve 300 would allow steady state operation at the operating point OP; however, the maximum output voltage would be only slightly over 50 volts. This is not sufficient to stabilize the stick welding arc. In a like manner, operating characteristic curve 302 again allows steady state operation at operating point OP; however, the maximum output voltage is not within the shaded area schematically illustrated in FIG. 7. Operating characteristic curve 304 does produce a sufficient maximum output voltage to stabilize the arc in a stick welder; however, this curve does not allow steady state operation at point OP. FIG. 7 illustrates that there is a family of operating curves wherein the maximum output voltage and operating point are obtained. Selecting the appropriate limiting inductor and number of turns in the auxiliary windings allows these two parameters to be realized.

Figure 8:
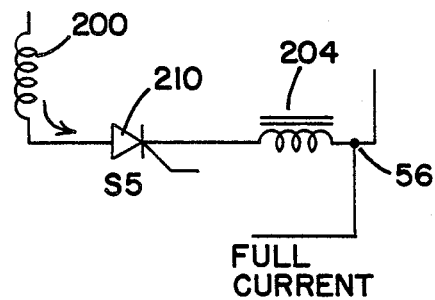
FIG. 8 is a simplified circuit similar to FIG. 6 showing the use of a switchable unidirectional device in the auxiliary windings; and, FIG. 9 is a typical voltage/current characteristic curve obtained by employing the present invention and illustrating a further aspect of the invention.
Figure 9:
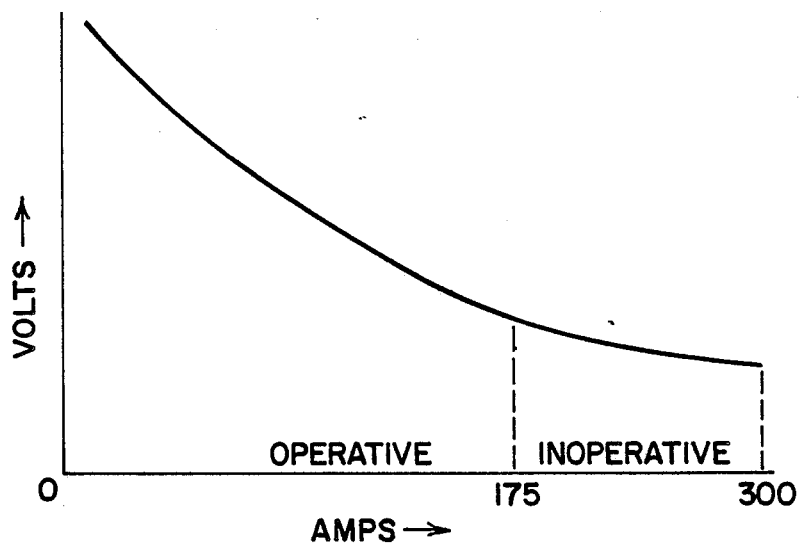

Another aspect of the present invention is schematically illustrated in FIGS. 8 and 9. To reduce the stress on the primary circuitry or windings of inverter 10, unidirectional devices 210, 212 are switchable devices, such as SCRs S5, S6, respectively. These switches S5, S6 are operated by gating circuit 100 (outputs 5 and 6 as illustrated in FIG. 1) to trigger them on at lower average output currents. To reduce the stress on the primary circuits, SCR's S5, S6 are inhibited when the welding operation has an average output current above a preselected level, illustrated as 175 amperes in FIG. 9. This current level is sensed by shunt 120 and its output is directed to circuit 100 by schematically illustrated line 122. In practice, inverter 10 is a 300 ampere inverter and the cutoff point is approximately 150 amperes to 175 amperes. Above this cutoff, the SCRs S5, S6 are inhibited so that windings 200, 202 (S5, S6) are inoperative. Below the cutoff point, windings 200, 202 are operative in accordance with the previous discussion.

Having thus defined the invention, the following is claimed:

1. In a high frequency power supply for supply a D.C. current through a choke to a welding station including an electrode element and a workpiece element, said power supply including a transformer having a core, primary windings and first and second secondary windings connected in series at a common junction to define spaced winding ends defining first and second output terminals, means for connecting said common junction to one of said welding station elements and means for connecting said first and second output terminals to the other of said welding station elements, means for alternately passing current pulses through said primary windings to induce current flow through said second windings in pulses of opposite directions and first and second secondary unidirectional devices connected between each of said output terminals and said other element respectively whereby pulses of D.C. current are directed to said welding station filtered through said choke, the improvement comprising: a first auxiliary current boosting winding connecting to and in series with said first secondary winding and a first current control circuit means for connecting said first auxiliary winding to one of said welding station elements, said first current control circuit means including a first auxiliary unidirectional device poled the same as the said first secondary unidirectional device between said first output terminal and said other of said welding station elements and a current limiting element in series and a second auxiliary current boosting winding connected to and in series with said second secondary winding and a second current control circuit means for connecting said second auxiliary winding to said one of said welding station elements, said second current control circuit means including a second auxiliary unidirectional device poled the same as said second secondary unidirectional device between said second terminal and second terminal and said other of said welding station elements and current limiting element.

2. The improvement as defined in claim 1 wherein current limiting means of said first and second current control circuit means are inductors.

3. The improvement as defined in claim 2 wherein said unidirectional devices in said first and second current control circuit means are selectively switchable between a conductive state and non-conductive state.

4. The improvement as defined in claim 3 including means for sensing the current flow through said welding station and means for holding said unidirectional devices of said current control circuits non-conductive when said sensed circuit is above a preselected value.

5. The improvement as defined in claim 4 wherein said means for alternatively passing current pulses through said primary windings includes a first switch means for passing a pulse of current through primary windings to magnetize said core and a second switch means for passing a pulse of current through said primary windings to remagnetize said core and a trigger circuit for alternately actuating said first and second sets of switches.

6. The improvement as defined in claim 1 wherein said unidirectional devices in said first and second current control circuit means are switchable selectively between conductive state and a non-conductive state.

7. The improvement as defined in claim 6 including means for sensing the current flow through said welding station and means for holding said unidirectional devices of said current control circuits non-conductive when said senses current above a preselected value.

8. The improvement as defined in claim 6 wherein said means for alternately passing current through said primary windings includes a first switch means for passing a pulse of current through said primary windings to magnetize said core and a second switch means for passing a pulse of current through said primary windings to remagnetize said core and a trigger circuit for alternately actuating said first and second sets of switches.

9. The improvement as defined in claim 1 wherein said means for alternately passing current through said primary windings includes a first switch means for passing a pulse of current through said primary windings to magnetize said core and a second switch means for passing a pulse of current through said primary windings to remagnetize said core and a trigger circuit for alternately actuating said first and second sets of switches.

10. The improvement as defined in claim 1 wherein said current pulse passing means includes means for creating said current pulses passing through said primary windings at a rate between 3-35 KHz.

11. The improvement as defined in claim 6 wherein said current pulse passing means includes means for creating said pulses passing through said primary windings at a rate between 3-35 KHz.

12. The improvement as defined in claim 1 wherein said primary winding is divided into first and second sections and pulse passing means includes means for alternately passing a first current pulse through said first section and a second current pulse through said second section to thereby alternately magnetize and remagnetize said core.

13. The improvement as defined in claim 9 wherein said first switch means includes a first set of switches actuated in unison and said second switch means includes a second set of switches actuated in unison.

14. A method of supplying a D.C. current through a choke to a welding station including an electrode element and a workpiece element, said method comprising the steps of;
    (a) providing an output transformer having a core, primary windings and first and second secondary windings connected in series at a common junction to define spaced winding ends defining first and second output terminals;
    (b) connecting said common junction to one of said welding station elements;
    (c) connecting said first and second output terminals to the other of said welding station elements;
    (d) alternately passing current pulses through said primary winding to induce current flow through said secondary windings in pulses of opposite directions;
    (e) providing unidirectional devices connected between said output terminals and said other element whereby pulses of D.C. current are directed to said welding station through said choke; and,
    (f) providing a section of additional turns to said first and second secondary windings while limiting the amount and direction of current flow through said additional turns.

15. A control circuit for the output of a high frequency inverter of the type having an output transformer with a core, primary windings and a secondary winding with two sections, means for creating a first pulse of electrical current in one section of said secondary winding when said primary windings magnetizes said core and a second pulse of electrical current in the other of said sections when said primary windings remagnetizes said core, and alternating switch means for magnetizing and remagnetizing said core at a preselected rate with said primary windings, said control circuit comprising: a first auxiliary winding connected to one of said secondary sections to create a first auxiliary current pulse as said core is magnetized, means for limiting the amount of said first auxiliary pulse and means for adding said first auxiliary pulse to said first secondary pulse and a second auxiliary winding connected to the other of
    said secondary sections to create a second auxiliary current pulse as said core is remagnetized, means for limiting the amount of said second auxiliary pulse and means for adding said second auxiliary pulse to said second secondary pulse whereby the maximum output voltage of said inverter is substantially increased and said voltage/current characteristic curve of said inverter is shifted upwardly.

* * * * *

UNITED STATES PATENT AND TRADEMARK OFFICE
CERTIFICATE OF CORRECTION

PATENT NO. : 4,897,522
DATED : January 30, 1990
INVENTOR(S) : Dale L. Bilczo, Larry L. Church, Michael J. Kurchak It is certified that error appears in the above-identified patent and that said Letters Patent is hereby corrected as shown below:

Column 4, line 4, "electrode" should read --- electrodes ---.
Column 8, line 67, "has" should read --- as ---. Claim 1, line 14, "second" should read --- secondary ---; line 20, "connecting" should read --- connected ---; line 37, delete "second terminal and"; line 38, after "and" insert --- a ---. Claim 4, line 5, "circuit" should read --- current ---. Claim 5, line 2, "alternatively" should read --- alternately ---. Claim 7, line 5, "senses" should read --- sensed ---, and after "current" insert --- is ---.

Signed and Sealed this

Third Day of December, 1991

Attest:

HARRY F. MANBECK, JR.

*Attesting Officer*     *Commissioner of Patents and Trademarks*

REEXAMINATION CERTIFICATE (1809th)
United States Patent [19]
Bilczo et al.

[11] B1 4,897,522
[45] Certificate Issued  Oct. 13, 1992

[54] OUTPUT CONTROL CIRCUIT FOR INVERTER

[75] Inventors: Dale L. Bilczo, Rocky River; Larry L. Church, Jefferson; Michael J. Kurchak, Eastlake, all of Ohio

[73] Assignee: The Lincoln Electric Company, Cleveland, Ohio

Reexamination Request:
No. 90/002,608, Jan. 15, 1992

Reexamination Certificate for:
Patent No.: 4,897,522
Issued: Jan. 30, 1990
Appl. No.: 306,470
Filed: Feb. 6, 1989

[51] Int. Cl.[5] .......... B23K 9/10; H02M 3/335
[52] U.S. Cl. .............. 219/130.32; 323/258; 363/26; 363/86
[58] Field of Search ........ 363/24, 25, 26, 85, 363/86, 128, 129; 323/258, 263; 219/130.1, 130.21, 130.31, 130.32, 130.33

[56] References Cited

U.S. PATENT DOCUMENTS 3,356,928 12/1967 Parrish .................. 321/18
3,530,359 9/1970 Grist .

*Primary Examiner*—Clifford C. Shaw

[57] ABSTRACT

A control circuit is provided for the output of a high frequency inverter of the type having an output transformer with a core, primary windings and a secondary winding with two sections for creating a first secondary current pulse of electrical current in one section when the primary windings magnetizes the core and a second secondary current pulse in the other of the secondary sections when the primary winding remagnetizes the core. By alternating switch means for passing current through the primaries to magnetize and remagnetize the core at a preselected rate the output current pulses are provided by the two sections of secondary windings. The control circuit of the present invention involves a modification of the output transformer secondary stage. A first auxiliary winding is connected to one of the secondary sections to create an auxiliary current pulse as the core of the transformer is magnetized. A means is then employed for limiting this auxiliary current pulse and for adding the limited auxiliary current pulse to the first secondary pulse created by the secondary section to which the auxiliary winding is connected. In a like manner, a second auxiliary winding is connected to the other of the secondary sections to create a second auxiliary current pulse as the core is remagnetized. Means are provided for limiting the secondary auxiliary current pulse and for adding the second auxiliary current pulse to the second secondary current pulse from the secondary winding. Addition of limited current pulses to secondary current pulses created by the inverter provides a maximum output voltage which is higher than the maximum output voltage normally available while conserving primary current under higher output current conditions.

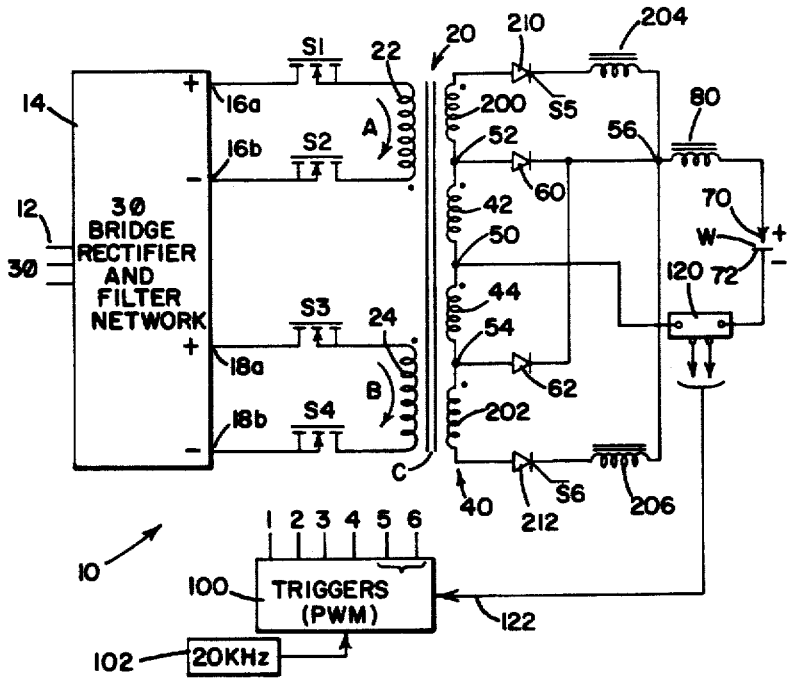

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 and 15 is confirmed.

Claim 14 is determined to be patentable as amended.

14. A method of supplying a D.C. current through a choke to a welding station including an electrode element and a workpiece element, said method comprising the steps of:

(a) providing an output transformer having a core, primary windings and first and second secondary windings connected in series at a common junction to define spaced winding ends defining first and second output terminals;

(b) connecting said common junction to one of said welding station elements;

(c) connecting said first and second output terminals to the other of said welding station elements;

(d) alternately passing current pulses through said primary [winding] *windings* to induce current flow through said secondary windings in pulses of opposite directions;

(e) providing unidirectional devices connected between said output terminals and said other element whereby pulses of D.C. current are directed to said welding station through said choke; and, (f) providing a section of additional turns to said first and second secondary windings while limiting the amount and direction of current flow through said additional turns.

* * * * *